Figure 1:
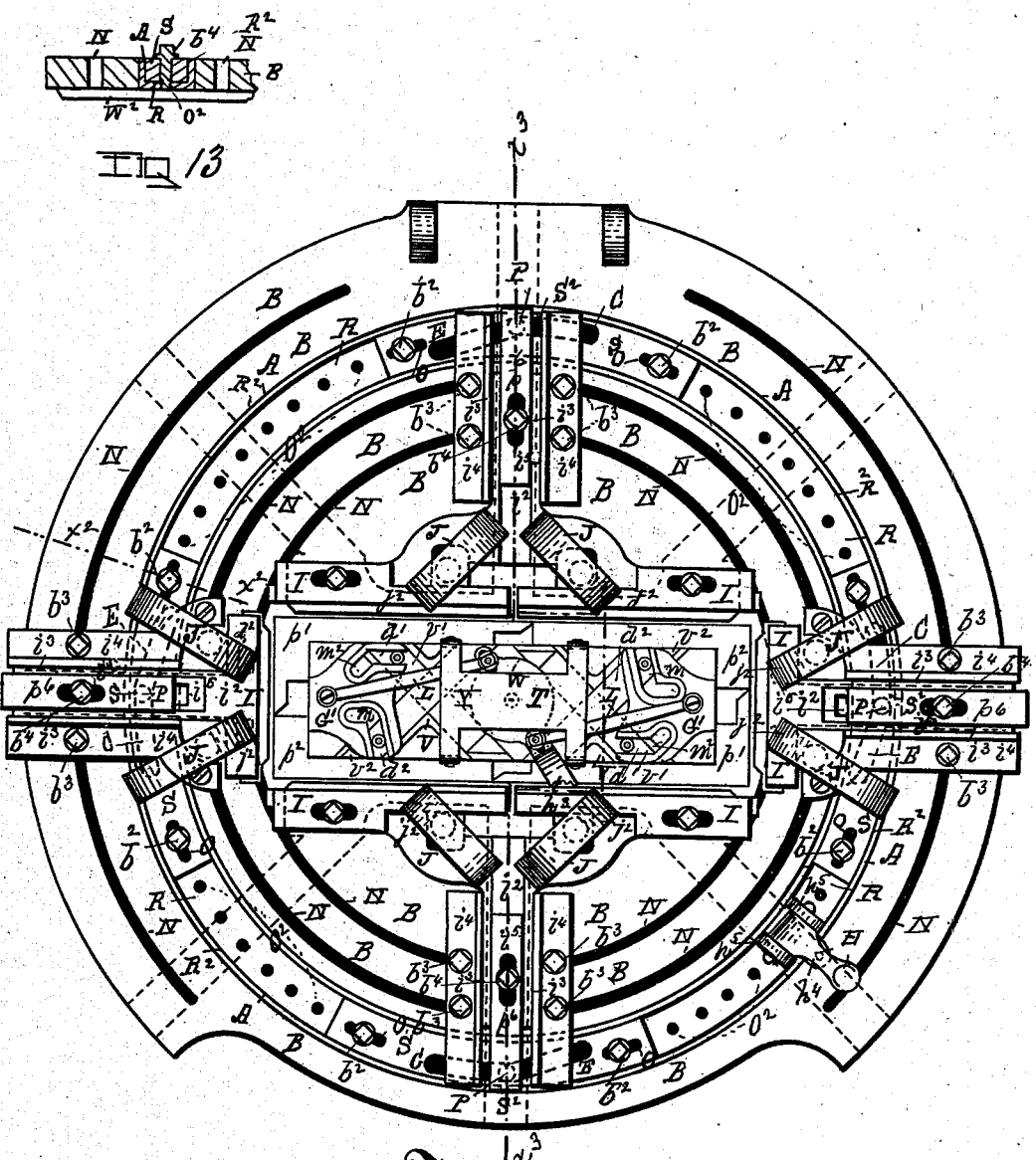

No. 714,787. Patented Dec. 2, 1902.
G. J. DORMANDY.
MACHINE FOR FOLDING COLLAR BLANKS, &c.
(Application filed May 25, 1897. Renewed Nov. 1, 1899.)
(No Model.) 12 Sheets—Sheet 1.

Witnesses
Inventor.

No. 714,787. Patented Dec. 2, 1902.
G. J. DORMANDY.
MACHINE FOR FOLDING COLLAR BLANKS, &c.
(Application filed May 25, 1897. Renewed Nov. 1, 1899.)

(No Model.) 12 Sheets—Sheet 2.

Witnesses
William A. Sweet
Charles S. Brintnall

Inventor.
Garry J. Dormandy
by W. E. Hagan
atty

No. 714,787. Patented Dec. 2, 1902.
G. J. DORMANDY.
MACHINE FOR FOLDING COLLAR BLANKS, &c.
(Application filed May 25, 1897. Renewed Nov. 1, 1899.)

(No Model.) 12 Sheets—Sheet 3.

Witnesses.
William A. Sweet
Charles S. Brintnall

Inventor.
Garry J. Dormandy
by W. E. Hagan
Atty

No. 714,787. Patented Dec. 2, 1902.
G. J. DORMANDY.
MACHINE FOR FOLDING COLLAR BLANKS, &c.
(Application filed May 25, 1897. Renewed Nov. 1, 1899.)

(No Model.) 12 Sheets—Sheet 4.

No. 714,787. Patented Dec. 2, 1902.
G. J. DORMANDY.
MACHINE FOR FOLDING COLLAR BLANKS, &c.
(Application filed May 25, 1897. Renewed Nov. 1, 1899.)

(No Model.) 12 Sheets—Sheet 5.

No. 714,787. Patented Dec. 2, 1902.
G. J. DORMANDY.
MACHINE FOR FOLDING COLLAR BLANKS, &c.
(Application filed May 25, 1897. Renewed Nov. 1, 1899.)
(No Model.) 12 Sheets—Sheet 7.

Witnesses.
William A. Sweet
Charles S. Burntnall

Inventor
Harry J Dormandy
by W E Hagan Atty

No. 714,787. Patented Dec. 2, 1902.
G. J. DORMANDY.
MACHINE FOR FOLDING COLLAR BLANKS, &c.
(Application filed May 25, 1897. Renewed Nov. 1, 1899.)

(No Model.) 12 Sheets—Sheet 8.

Witnesses.
William A. Swert
Charles S. Burntnall

Inventor.
Garry J. Dormandy
by W. E. Hagan
Atty

No. 714,787. Patented Dec. 2, 1902.
G. J. DORMANDY.
MACHINE FOR FOLDING COLLAR BLANKS, &c.
(Application filed May 25, 1897. Renewed Nov. 1, 1899.)
(No Model.) 12 Sheets—Sheet 10.

No. 714,787. Patented Dec. 2, 1902.
G. J. DORMANDY.
MACHINE FOR FOLDING COLLAR BLANKS, &c.
(Application filed May 25, 1897. Renewed Nov. 1, 1899.)

(No Model.) 12 Sheets—Sheet 12.

WITNESSES
William A. Swett
Charles S. Bruntnall

INVENTOR
Gurry J. Dormandy
by W. E. Hagan atty

UNITED STATES PATENT OFFICE.

GARRY J. DORMANDY, OF LANSINGBURG, NEW YORK, ASSIGNOR TO THE UNITED SHIRT AND COLLAR COMPANY, OF TROY, NEW YORK.

MACHINE FOR FOLDING COLLAR-BLANKS, &c.

SPECIFICATION forming part of Letters Patent No. 714,787, dated December 2, 1902.

Application filed May 26, 1897. Renewed November 1, 1899. Serial No. 735,544. (No model.)

*To all whom it may concern:*

Be it known that I, GARRY J. DORMANDY, a citizen of the United States, residing at the village of Lansingburg, county of Rensselaer, and State of New York, have invented certain new and useful Improvements in Machines for Infolding the Edges of Cuff-Blanks or Like Articles, of which the following is a specification.

My invention relates to machines for infolding the edges of blanks for cuffs or like articles. More particularly my invention relates to that class of folding-machines in which an expanding and contracting templet or die is operated to rest upon the blanks to be infolded and folders or infolders actuated to move inwardly and outwardly for folding edge portions of the blanks over edge portions of the templet.

As heretofore constructed the infolders of cuff and collar infolding machines have been arranged and operated in such manner that the several infolders would move inwardly at the same time and outwardly at the same time, so that when applied to infold the rounded corners of blanks the infolders gathered in the material radially and when applied to infold angular corners they caused the material to bunch up in a diagonal line of direction.

It is one of the objects of the present invention to do away with the above defect.

Another object is to provide a machine upon which a lock-corner blank may be produced, lock-corner blanks heretofore not having been produced without two or more insertions of the blank in a machine or two or more machines excepting when folded by hand. This object is accomplished in the present instance of my invention by providing a templet adapted to bear directly upon the blanks upon the bed and infolders having in the machine illustrated means for operating them successively in sets, so that the infolds last formed may overlap other infolds at corners of the blanks. A series or set of infolders are shown adapted to be operated while others are at rest, to be succeeded by having the infolders first operated become stationary while others become operative with the blank remaining stationary upon the bed. Equivalent methods of operating infolders may be employed.

A further object is to provide a mechanism for operating infolders, the mechanism of such construction that it may be reversed in movement so that the infolders may be operated in a different order, whereby in the second of two succeeding operations of the machine a blank may be formed having lock-corners the reverse of the corresponding corners of the preceding blank, and when the two blanks are laid one over the other the infolds may be entered one within the other at the lock-corners to interlock or anchor, in which position the blanks are sewed together.

My invention relates also to a construction and arrangement of segments fitted to move to and fro in unison, serving through suitable means to operate the infolders in such a manner that by reversing the initiatory movement of the segments as to direction the order in which the side and end infolds are produced will be reversed, with an accompanying reversal of the overlaps at the corners, with these segments so constructed and connected as to be adapted to actuate infolders for various forms of blanks in the same machine.

My invention also relates to the segments which actuate the infolders and to their construction and arrangement in such manner that, after having been used to infold the side and end edges of the blanks in alternating sequence, by turning over the segments for operating either the side or end infolders the segments so turned and the infolders operated by them will move at the same time as the other segments and connected infolders, and thus act upon the side and end edges of the blanks at the same time when desired.

My invention also relates to a special means to infold irregular or projecting portions of blanks—as, for example, the tab end or nosing often provided for cuffs.

My invention also relates to a manner of constructing cuff and collar infolding machines so that templets and infolders having corresponding edges may be applied to the machine to infold differing forms of collars and cuffs, and thus avoid the necessity of having a separate machine for each kind of collar and cuff to be infolded.

My invention also relates to an improved construction of templet for cuff and collar infolding machines, said templet having expanding and indrawing plates, whereby when the latter are expanded they will form upon their end and sides a continuous edge, and thus give to the infolds produced thereon a uniformity of infold.

Accompanying this specification to form a part of it there are twelve plates of drawings containing seventeen figures illustrating my invention, with the same designation of parts by letter reference used in all of them.

Figure 2:
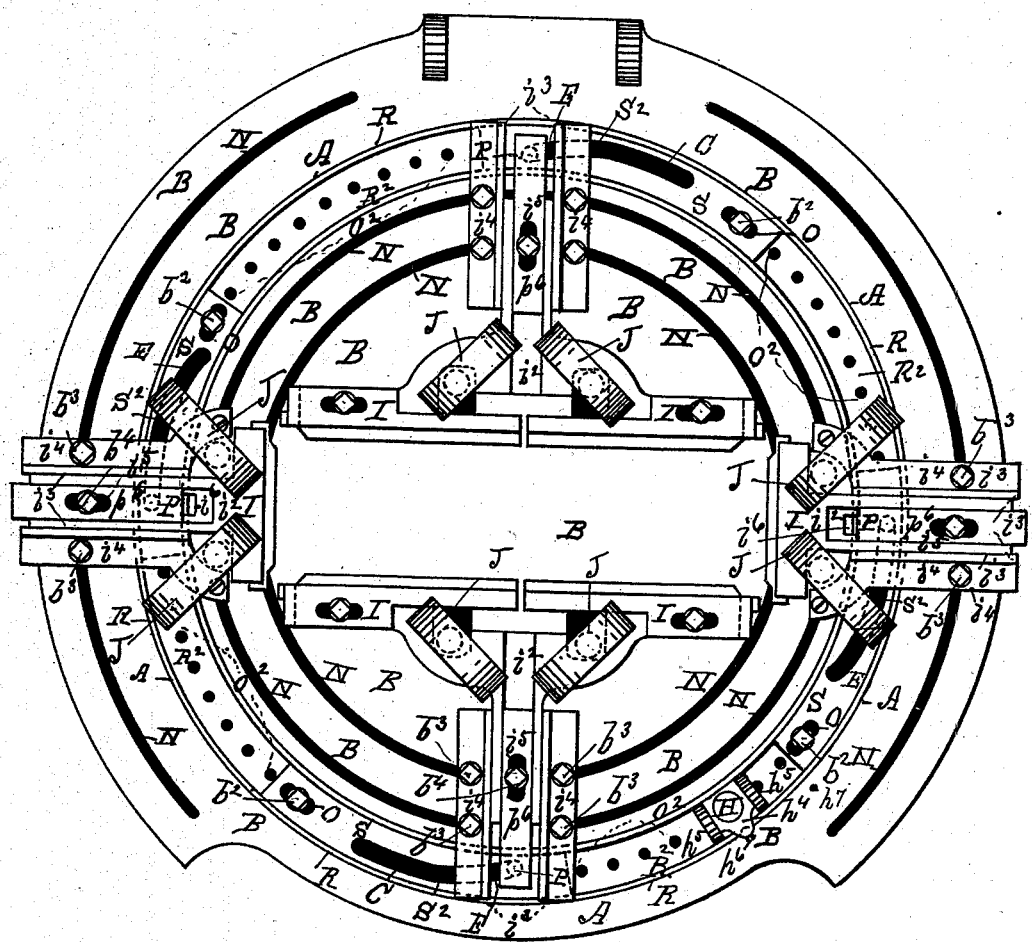
Figure 3:
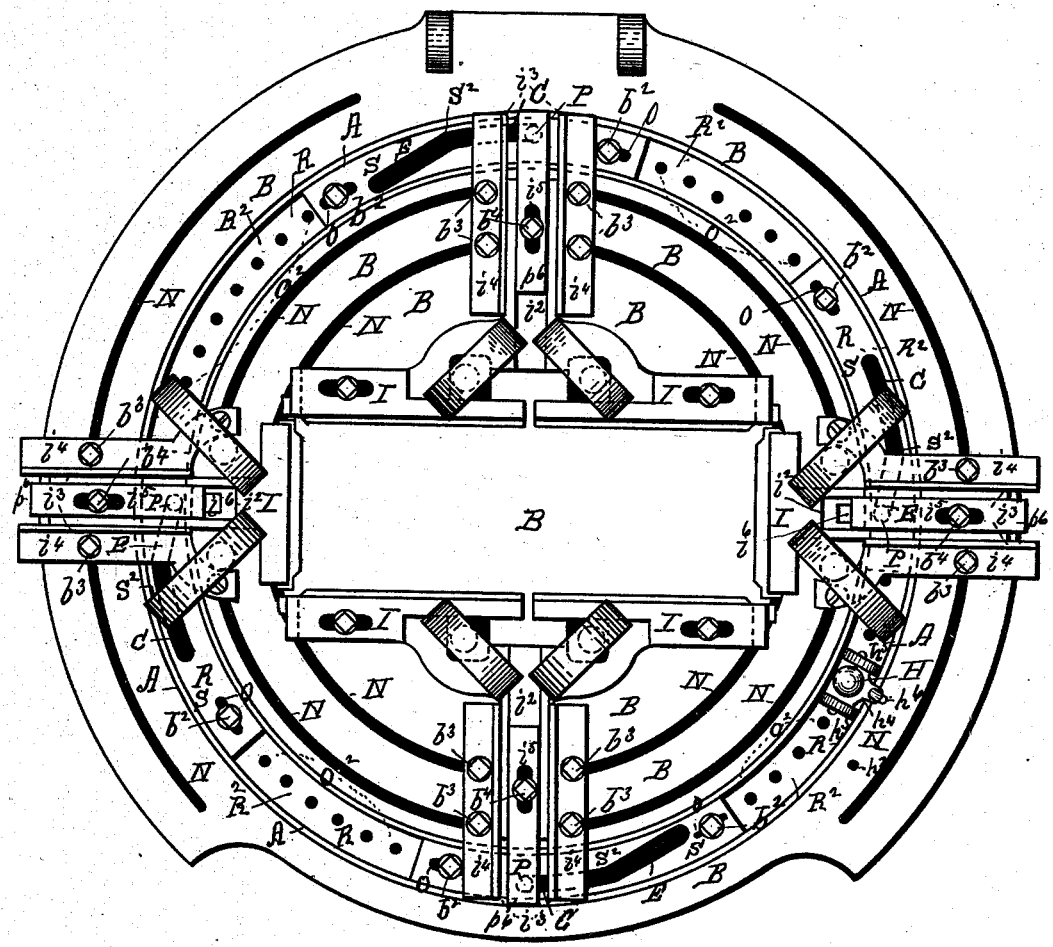
Figure 4:
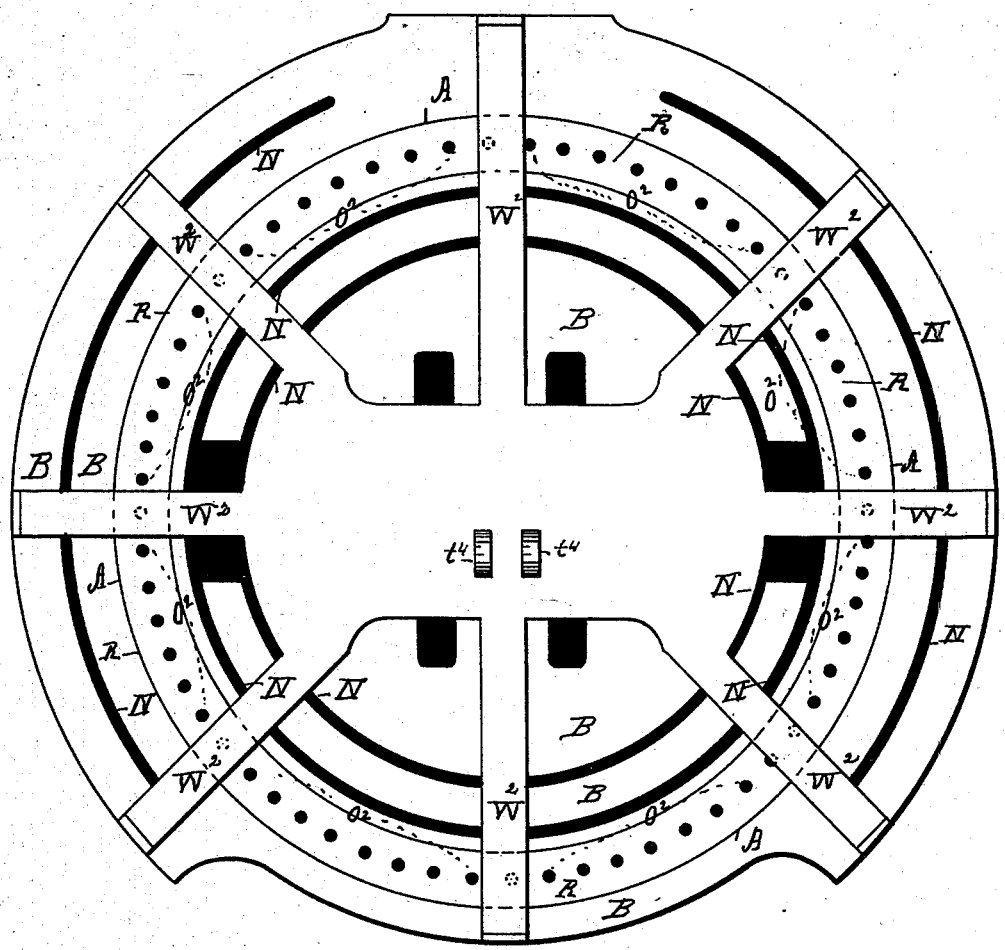
Figure 5:
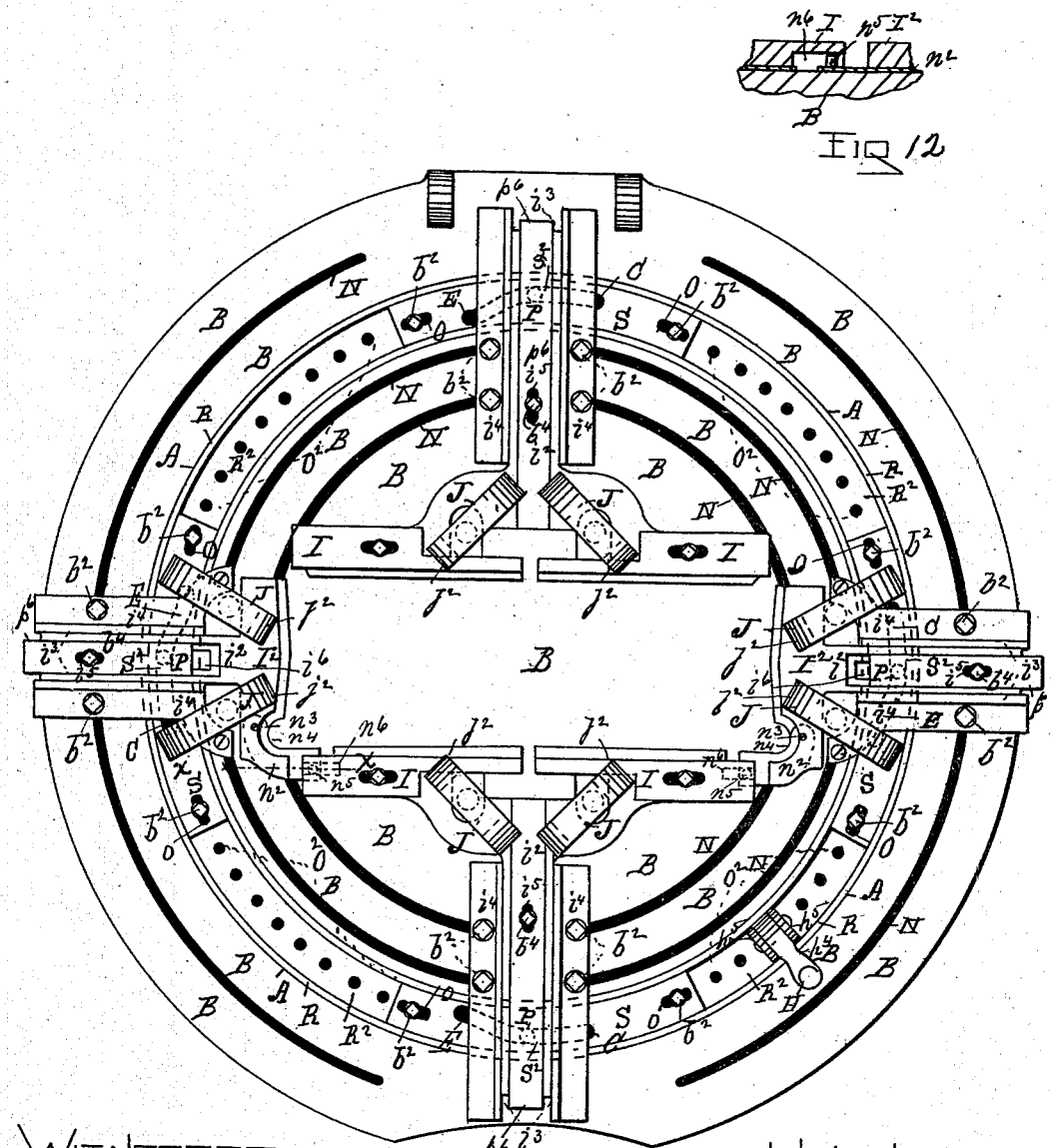
Figure 6:
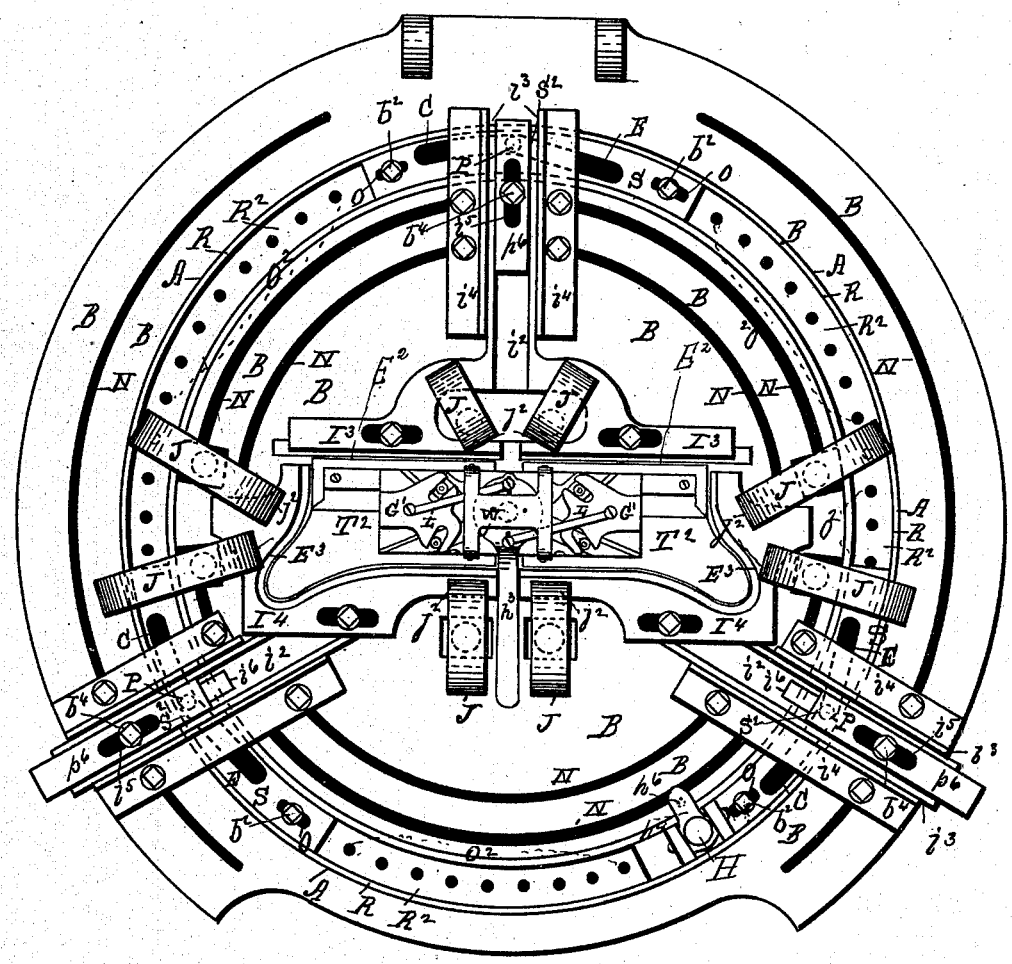
Figure 7:
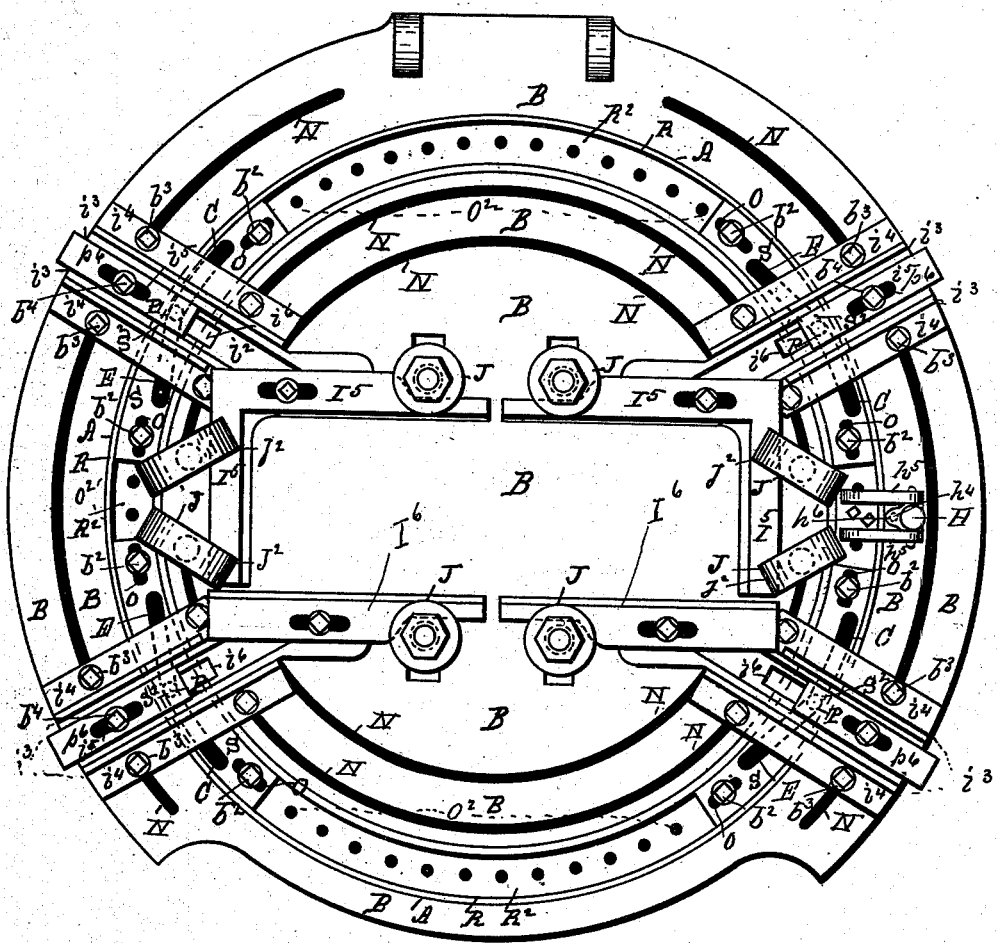
Figure 8:
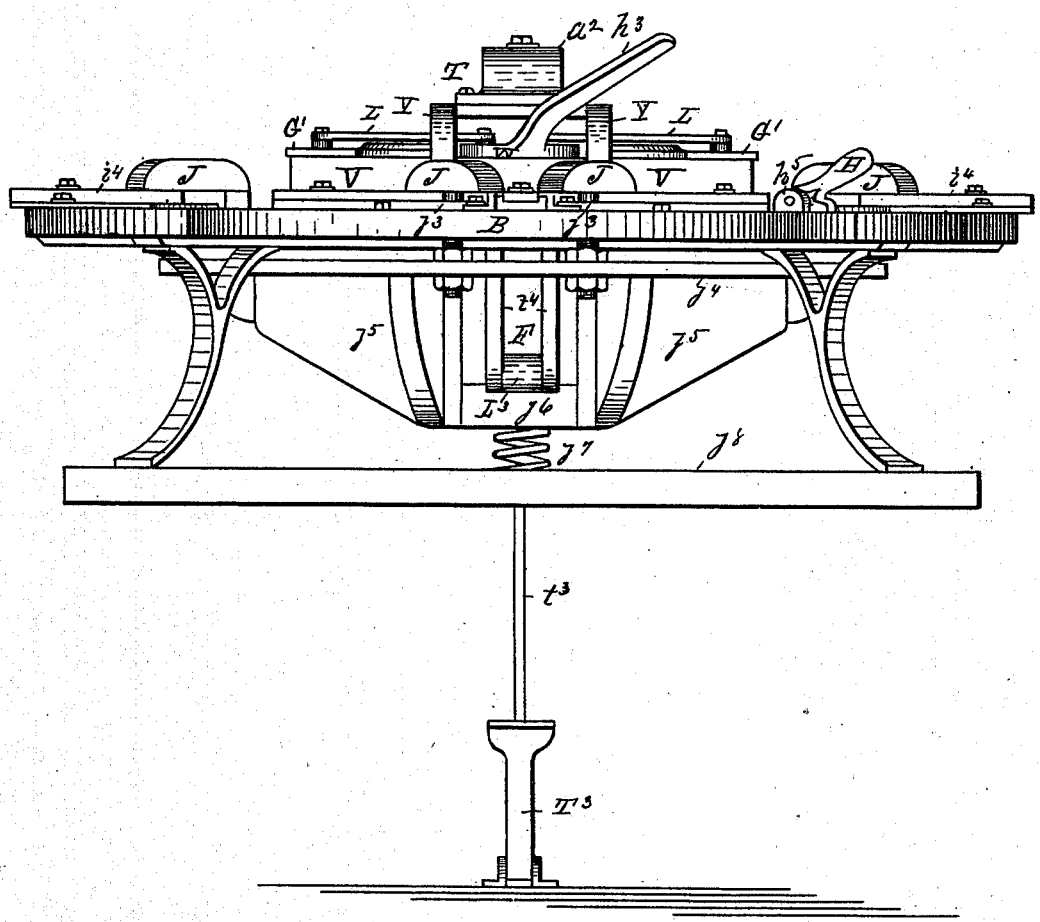
Figure 9:
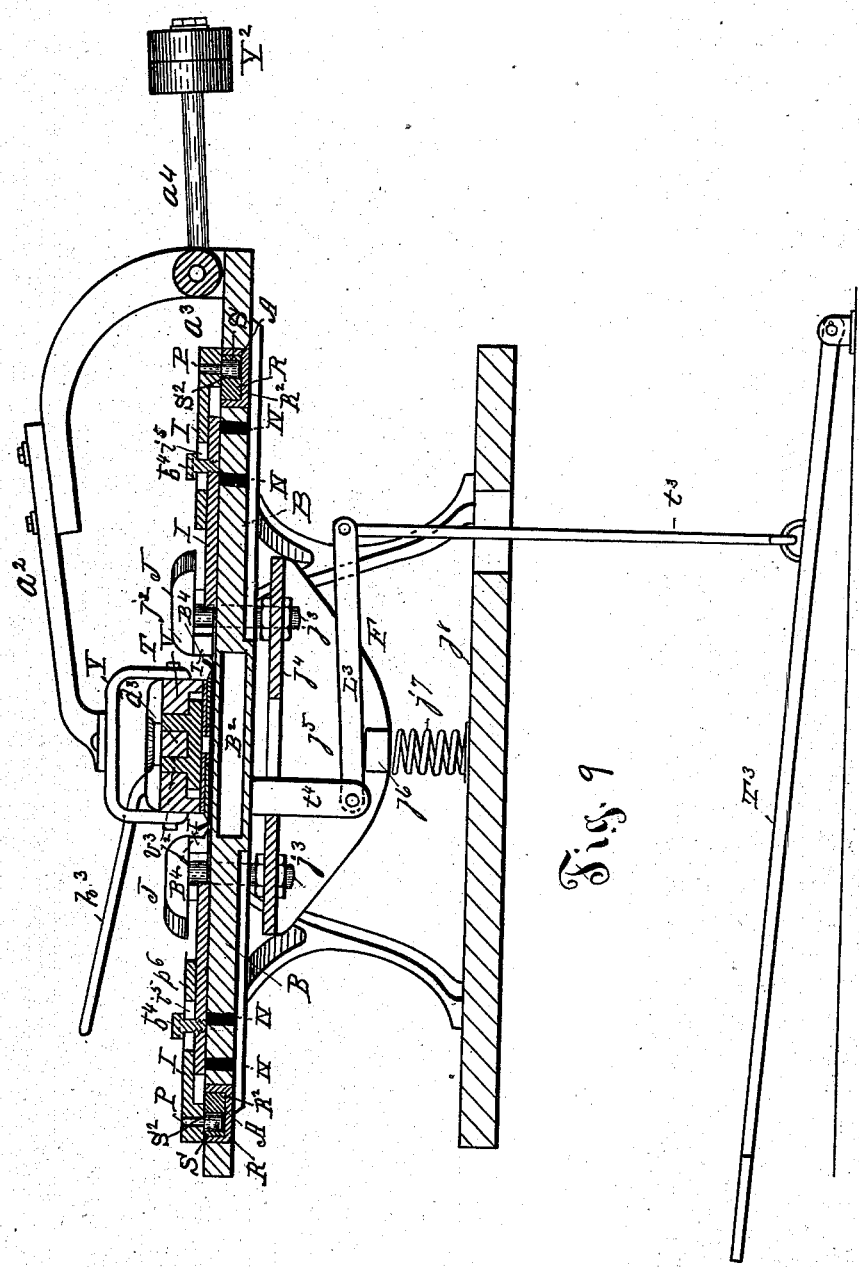
Figure 10:
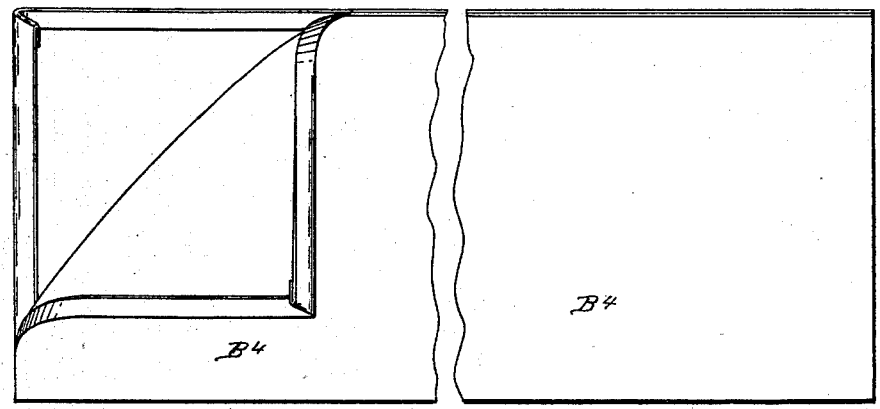
Figure 11:
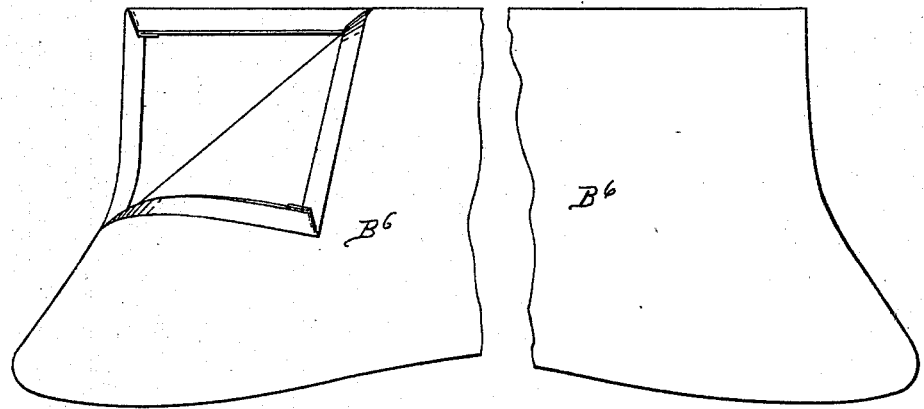
Figure 14:
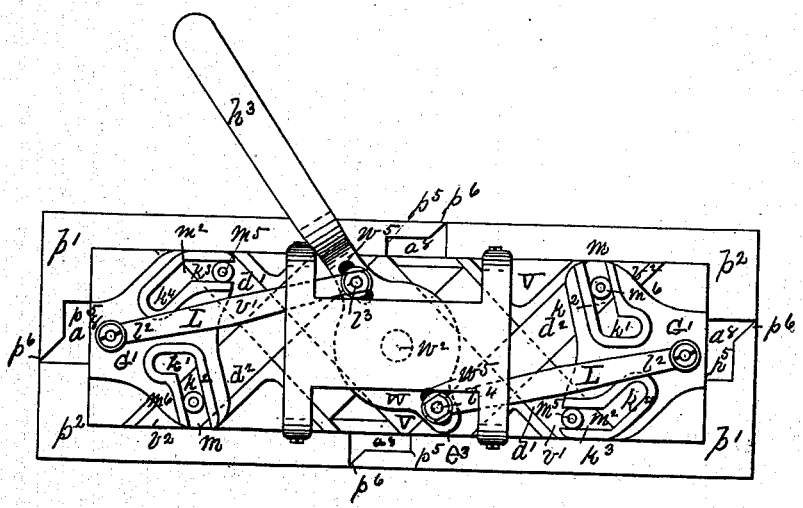
Figure 15:
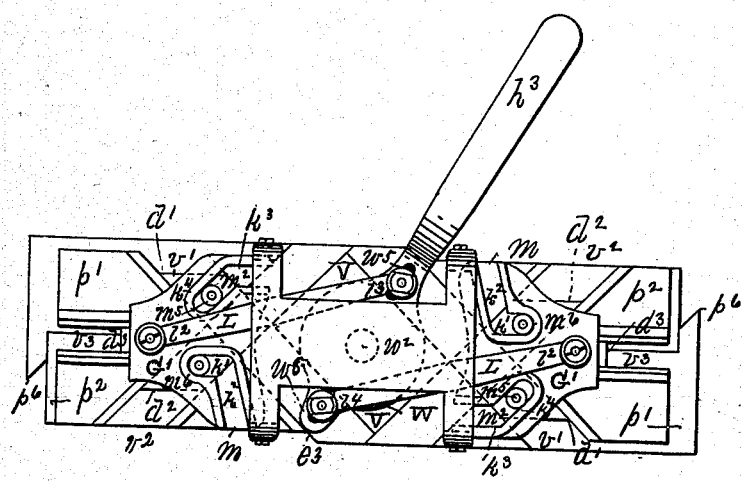
Figure 16:
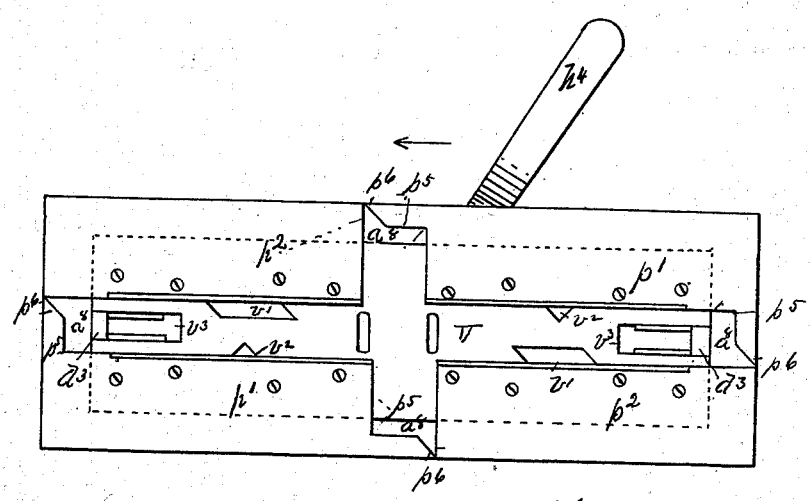
Figure 17:
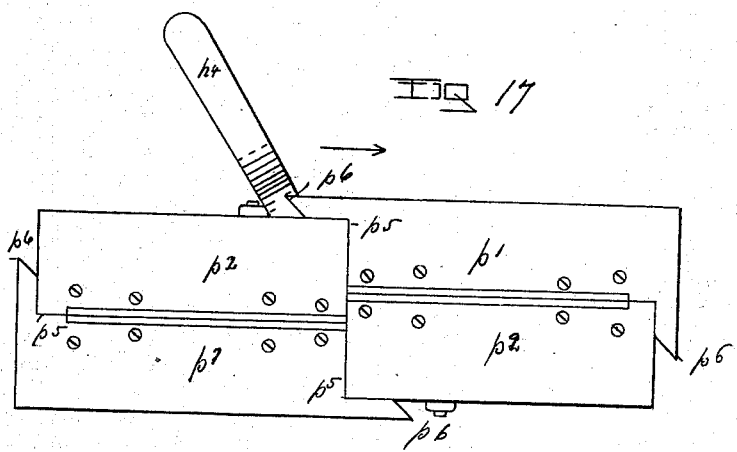

Of the illustrations, Figure 1 is a top view of a cuff and collar infolding machine containing my invention, in which two end and two side infolders are radially arranged upon the machine-bed and at right angles to each other, with the infolders moved outwardly for the insertion of a blank upon the bed and with the templet resting on the blank with its plates expanded, webs on the bottom of the machine being indicated by a dotted line. Fig. 2 is another top view of the machine shown at Fig. 1, with the side infolders illustrated as moved inwardly to form the side infolds upon the blank with the templet omitted and with the end infolders shown as not having been operated upon. Fig. 3 is another top view of the machine shown in the before-described figures, with the end infolders illustrated as moved inwardly to produce the end infolds in the blank, so that they will overlap at the corners the previously-made side infolds with the templet omitted. Fig. 4 is a plan view of the under side of the machine. Fig. 5 illustrates in another top view the machine shown at Figs. 1, 2, 3, and 4, with the infolders in a position to have a blank placed on the bed by being moved outwardly and the end infolders at each of their lower ends provided with a pivoted nosing or tab bar, whereby a nosing or tab formed in the blank thereat may be gathered in thereat over the coinciding tab or nosing end part of a templet. (Not shown.) Fig. 6 is a top view of the machine that is shown at Figs. 1, 2, 3, and 4, with only three infolders employed and with the latter so placed upon the bed that one of the infolders is adapted by its position to form the infold upon one side of the blank, and the other two infolders are each adapted by their position and form on their inner edges to form the infolds upon one end and part of the other side of the blank at the same time and each having a nosing or tab recess formed therein at the corners where connecting with the side part which they infold, said infolders being adapted to operate in connection with a templet having corresponding form upon the outer edges of its plates when expanded, which templet is shown with the arm by which it is operated to descend onto and rise from off the bed omitted. Fig. 7 is another top view of the machine shown in the other figures before described with two of the infolders arranged at each side upon the bed at an acute angle to each other, with the infolders shown in a position to have a blank inserted and to have one infolder of each pair operate together, so as to produce the infold upon one side of the blank, and the remaining infolder of each pair operated together to form one end and half of other side infold of the blank and so that the infold last produced will overlap at the corners the infold first made. Fig. 8 is a front elevation of the machine. Fig. 9 is a section taken from front to rear of Fig. 1 on the line $x^3 x^3$, with the templet-arm, its counterpoise, and the templet-yoke, as well as the treadle and pressing mechanism, shown in side elevation. Fig. 10 is a plan view of an infolded cuff having rectangular corners and shown as broken in two parts with one of the blanks illustrated as turned over and down to show the position of the overlapping-corner infolds. Fig. 11 shows in a plan view a pair of blanks folded by the machine with the infolders shown as arranged at Fig. 7, with the two blanks illustrated as broken apart, and one of them turned over and down to show the position of the overlapping infolds at the corners by which they are adapted to interlock and be anchored when sewed. Fig. 12 is a section taken on the line $x x$ of Fig. 5. Fig. 13 is a section taken on the line $x^2 x^2$ of Fig. 1. Fig. 14 is a top view of a templet adapted to be used in connection with the infolders shown at Figs. 1, 2, and 3 and illustrated with its plates as expanded to form a continuous edge at the sides and ends. Fig. 15 is a top view of the templet shown at Fig. 14 with the plates illustrated as drawn inwardly. Fig. 16 is a plan view of the under side of the templet shown at Figs. 14 and 15 and with its plates illustrated as expanded. Fig. 17 is another bottom view of the templet shown at Fig. 16 with its bottom plates drawn inwardly.

The several parts of the apparatus thus illustrated are designated by letter reference, and the function of the parts is described as follows:

The letter B designates the bed of a machine embodying my invention, and which may be constructed with a heating-chamber $B^2$, as shown in cross-section at Fig. 9, in which chamber gas may be burned or steam used to heat the bed.

The letter A designates a bearing or slideway, preferably annular in form, provided in the bed, and the letter R a slide or ring which is adapted to engage said slideway to slide therein. The ring R may be provided with an annular recess $R^2$, as shown in cross-section at Fig. 13.

The letter H designates an upwardly-projected handle connected to the upper surface of the ring and by which the ring can be moved to and fro in the slideway.

The letters S designate segments, preferably arc form, each of which is adapted by its form to be entered within the annular recess R² and which may be adjustably connected therein by means of bolts $b^2$, passing through slotted openings O to enter a threaded bolt-passage O², formed for convenience in the bottom of the recess R². Each of these segments is constructed with a slot S², which constitute a cam intermediate the segment and an infolder. The cam may have a slot part E, which is eccentric or inclined to the direction of movement of the segment and with the said eccentric slot part connecting with a slot part C, which is concentric and hence inoperative.

The letters I designate infolders. The infolders shown at Figs. 1, 2, 3, and 5 have the same general form upon their infolding edges, with the exception of the modification shown at Fig. 5, in which a nosing or tab end is made an infolding feature. Each of these infolders I is connected with a slide-bar $i^2$, constructed and fitted to move inwardly and outwardly. $i^3$ represents a slideway for guiding the slide-bar and may be produced between two bars $i^4$ $i^4$, placed upon the machine-bed and constructed for convenience to be adjustably connected thereto by means of bolts $b^3$, passing through said bars $i^4$ and annular slots N N N, formed in the bed, with nuts threaded onto the lower end of the bolts, arranged to straddle the under side edges of the slots through which they pass and by which means the infolders and their slide-bars may be placed with reference to each other in any desired radial position upon the bed, and thus adapt the machine to use various forms and location of infolders and so avoid the necessity of having a machine for each form of cuff or collar to be infolded.

The purpose of the described slideway construction, it will be seen, is to constitute guides or devices for fitting the infolder-bars to the support to move inwardly and outwardly, which guides or fitting devices are non-integral with or separable from said support, with means for securing the same upon the support, so that they may be adapted to be changed in position or in direction, or both, upon the support, and thereby render a single machine with one set of infolder-bars and fitting devices therefor capable of being employed in the infolding of various forms of blanks.

Each slide-bar $i^2$ may be fitted to be movable vertically sufficiently to permit the pressing of the infolds between the infolders and bed by means to be described herein. Each of these slide-bars $i^2$ may be provided with a slide-pin plate having upon its under side a downwardly-projected slide-pin P, adapted to move in one of the segment-slots, as will be described hereinafter. Each of these slide-pin plates $p^6$ at each side of the machine may be constructed to adjustably connect with the slide-bar proper, with which it operates by means of a bolt $b^4$, passing down through a slot $i^5$, formed in the slide-pin plate, and a slot $i^6$, formed in the slide-bar proper, with said bolt secured therein by means of a nut on its lower end arranged to straddle and engage with the under side edges of the slot $i^6$, and by which arrangement the slide-bar may be adjusted to regulate the position of the connected infolder relatively to the templet.

The letters W² designate webs which may be formed on the under side of the machine-bed to keep the annularly-segregated parts of the bed connected.

The letters T designate a templet which may be provided with contracting and expanding plates and adapted by the form of its expanded plates on their outer edges to be used in connection with the infolders illustrated at Figs. 1, 2, and 3, although the manner in which the plates of the templet T are shown to be constructed and operated to form a continuous infolding edge when moved outwardly may be applied to produce a continuous infolding edge in the same manner upon templet-plates adapted to infold differing forms of blanks.

Although I have shown a certain species of templet as applied to be used in connection with the infolders shown at Figs. 1, 2, and 3, any suitable species of templet having when its plates are expanded a form corresponding to that upon the inner edges of the infolders I may be used.

The letter $a^2$ designates an arm which at its front end connects with the templet T by means of a yoke Y, attached to the templet-stock, as shown at Fig. 9, and from where thus connecting this arm $a^2$ is rearwardly extended over the bed, and at its rear end it is journaled at $a^3$ to the outer edge of the bed, and at its rear where extending beyond its journaled connection it connects with an arm $a^4$, having at its outer end a counterpoise Y. As thus constructed, by means of the templet-handle $h^3$ the templet can be actuated to swing down so as to have its plates rest on a blank B⁷, placed upon the machine-bed, and to be automatically raised therefrom when the blank has been infolded and the grasp on the templet-handle is released. This method of arranging a templet to be operated to descend onto and to rise from off the machine-bed is a well-known mechanism used in that class of cuff and collar infolding machines to which my invention is shown as applied.

The templet T (shown at Figs. 1, 14, 15, 16, and 17) is provided with a stock V, having slideways $v'$ and $v^2$ opening out from each of its opposite sides, those upon one side being for convenience at right angles to those upon the opposite side, and said slideways are arranged in diagonally opposite corners of the stock.

The letter $v^3$ designates a slideway formed centrally and longitudinally in the stock at each end of the latter.

The letters $d'$ $d'$ and $d^2$ $d^2$ designate slide-bars, those designated at $d'$ being arranged to move in the slideways $v'$ and those designated at $d^2$ to move in the slideways $v^2$.

The letters $d^3$ designate a slide-bar arranged to move in each of the slideways $v^3$.

The letters $p'$ designate two plates, of which there is one secured to the under side of, so as to move with, each of the slide-bars $d'$, and the letters $p^2$ designate two plates, of which there is one connected to the under side of, and so as to move with, each of the slide-bars $d^2$.

The letters $G'$ $G'$ designate slide-plates, of which there is one at each end of the stock, and each of these last-named slide-plates is attached to the top of one of the slide-bars $d^3$, arranged in each of the slideways $v^3$.

The letters W designate a wheel which is centrally pivoted to the stock V at $w^2$, and the letter $h^3$ designates a handle which is projected from the front edge of the wheel, and the letter $e^2$ designates an ear which is offset from the rim of this wheel, so as to be diametrically opposite the handle $h^3$. This wheel W is provided with a slot $w^5$, located in part in the handle and part in the wheel, and the letter $w^6$ designates another slot formed in the offset ear $e^3$, so as to be diametrically in line with the slot $w^5$, formed part in the wheel and part in the handle, between the latter and the pivoted center of the wheel.

The letters L L designate two links, each of which is at one of its ends pivotally connected at $l^2$ to one of the slide-plates $G'$, and at its other end one of these links is pivotally connected to a slide-pin $l^3$, moving in the wheel-slot $w^5$, and the other link to a slide-pin $l^4$ in the slot $w^6$, said slide-pins making a sliding or cam engagement with the sides of the slots in which they are placed. As thus constructed, when the handle $h^3$ is horizontally reciprocated it reciprocatingly rotates the wheel W, and by means of the connection made between said wheel and the plates $G'$ $G'$ the latter are moved outwardly and inwardly.

The templet or blank-holder plates $p^2$ are formed for convenience with rectangular corners at the sides and ends, and the other templet or blank-holder plates $p'$ are alike cut away interiorly, with each of the cut-away areas $a^8$ of the plates $p'$ having the same rectangular boundaries $p^5$ and having the angularly-pointed parts $p^6$ on the edges of their cut-away areas, with the latter so formed that when the plates are moved outwardly from the stock they will meet to form a continuous infolding edge, and when the plates are drawn inwardly the plates $p^2$ will enter the cut-away areas of the plates $p'$, as shown at Fig. 17, with the plates when expanded appearing as shown at Fig. 16.

The letters $m$ designate a slot, of which there is one formed in one of the sides of each of the plates $G'$, and the letters $m^2$ designate other slots, of which there is one formed in the other side of each of the slide-plates $G'$, and with said slots so located with reference to the stock that there will be one of the slots $m$ in the side of one of the slide-plates $G'$ and one of the slots $m^2$ in the same side of the other slide-plate $G'$ at each side of the stock. Each of these slots $m$ at its inner end has a slot part $k'$, which is parallel to the slide-bar $d^3$ and made to connect with a slot part $k^2$, which is obtusely angular to the slot part $k'$, and each of the slots $m^2$ has a slot part $k^3$, which is also parallel to the slide-bar $d^3$ and connects with a slot part $k^4$, which is obtusely angular to the slot part $k^3$.

The letters $m^5$ designate slide-pins, of which there is one arranged in each of the slots $m^2$, constructed to make a sliding or cam engagement with the sides of the slot, and each of these slide-pins is mounted on and upwardly projected from one of the slide-bars $d'$, which latter is connected to the upper surface of one of the plates $p'$ at diagonally opposite corners of the stock.

The letters $m^6$ designate a slide-pin, of which there is one arranged in each of the slots $m$ to make a sliding or cam engagement therewith, and each of which pins is projected upwardly from one of the slide-bars $d^2$, connecting with one of the plates $p^2$, located at each diagonally opposite corner of the stock.

With the templet or blank-holder T thus constructed and its parts thus connected when the plates of the templet are drawn inwardly, as shown at Figs. 15 and 17, and the handle $h^3$ is moved in the direction indicated by the arrow the slide-pins $m^6$, as operated by the slide-plates $G'$, will first move in that portion of the slot or cam $m$ which is parallel to the slide-bar $d^3$ and then in the obtusely-angular parts of the same slot, while the slide-pins $m^5$ will first move in the angular slot parts and then in that portion of the slot $m^2$ which is parallel to the slide-bar $d^3$. The plates $p'$, connected with the slide-pins $m^5$, will be moved more rapidly than those operated by the slide-pins $m^6$, and as moved outwardly will be in a position to meet and form a continuous edge with the edge of the plates $p^2$, moved outwardly subsequently by the action of their slide-pins while engaging with the angular parts of the slots $m$. When the handle $h^3$ is reversed in its movement as to direction, the plates $p^2$ will be drawn inwardly, succeeded by an inward movement of the plates $p'$, whereby the former will enter the cut-away areas of the latter when being drawn inwardly, with the position of the plates thus operated upon indicated at Figs. 14 and 16.

I will now describe a means for pressing the blanks which may be used.

The letters J designate pressers which are employed to force downwardly the infolders, and thus press in the infolds as made, and these pressers are made with heads $j^2$, which overhang the infolders they are intended to operate upon. This head in this instance of its use is provided with a stud $j^3$, arranged to pass down freely through an opening in the machine-bed, and each of these studs at its lower end connects with a table part $j^4$ of a frame F.

The letters $j^5$ designate two downcast ends of the frame, and the letter $j^6$ designates a horizontally-placed bar, which at each of its ends connects rigidly with one of the frame ends $j^5$ at its lower end, as shown at Figs. 8 and 9.

The letter $j^7$ designates a spiral spring, of which there is one arranged at each end of said horizontal bar between the latter and the machine-table $j^8$.

The letter $L^3$ designates a lever having its fulcrum arranged in the lower end of the depending bar $t^4$ with this lever, between its fulcrum and operating end, resting upon the bar $j^6$ and at its operating end connecting with a foot-treadle $T^3$, by means of a connecting-rod $t^3$. As thus constructed and arranged to operate when the foot-treadle is forced downwardly at the front the lever $L^3$ draws downwardly the frame F and its connected presser-studs and pressers, so that the overhang of the latter will engage with and pull down the infolders, and when the pressure upon the foot-treadle is released therefrom the spiral springs $j^7$ at each end of the bar $j^6$ will act upon the latter and cause the presser-frame to rise and the pressers to ascend from off the infolders. The overhanging heads of the pressers may be elongated or shortened in their lateral extension, and the studs with which the heads connect may be turned in any direction to adjust the pressers to differing locations of the infolders upon the bed.

At Fig. 5 there is illustrated a modification of the end infolders shown at Figs. 1, 2, and 3, and in which modification the end infolders $I^2$ $I^2$ are shown as slightly curved inwardly and at their lower ends constructed to curve outwardly. The letter $n^2$ designates a nose-piece, of which there is one arranged to pivotally connect at $n^3$ with each of the end infolders $I^2$ $I^2$ at their lower ends. Each of these nose-pieces is curved to correspond with the incurve $n^4$, formed in each of the end infolders at their lower ends, and each of these nose-pieces is provided with a slide-pin $n^5$ at that end which is opposite to the pivoted connection with the end infolder. Each of these slide-pins is arranged to engage a slot $n^6$, formed in the adjacent infolder I, as shown at Fig. 12. With each of the nose-pieces $n^2$ pivotally connected at one of its ends to one of the infolders $I^2$ and at its other end making a slide-pin engagement with a slot formed in one of the infolders I when these infolders are together moved outwardly each of the nose-pieces will swing outwardly, and when the infolders are together moved inwardly the nose-pieces will each move inwardly, and in so doing gather in the edges of a blank and carry them over a nose-piece formed on a templet of corresponding form and which is not shown.

At Fig. 6 there are shown infolders $i^3$ $I^3$, having on their infolding edges $E^2$ a form adapted to infold one of the sides of a blank $B^6$, and also infolders $I^4$ $I^4$, having upon their infolding edges $E^3$ a form adapted to infold one end and part of the other side of the blank having a nosing or tab projected diagonally from the two lower corners, with all of these infolders adapted to be attached to and detached from the bed and adjusted thereon and actuated to be moved alternately by segments constructed according to my invention, as herein described.

At Fig. 7 there are illustrated infolders $I^5$ $I^5$, each adapted on its inner edges to form infolds upon one end, and part of one side of a cuff having two rounded corners and two rectangular corners and two other infolders $I^6$ $I^6$, adapted to infold the remaining side of the blank, with all of the infolders adapted to be attached to and detached from the bed as well as arranged to be alternatingly operated by means of segments constructed according to my invention described herein.

To the form of the infolder edges shown at Figs. 6 and 7 I make no claim. The infolders shown at Figs. 6 and 7 are illustrated merely to demonstrate the manner of applying my invention to operate successively in sets these few of the many differing forms of infolders possible and in such a manner that the infolds last produced will at the corners overlap those first made, and also demonstrate the means whereby the infolders and segments as constructed according to my invention may be arranged upon the bed of the machine in differing radial positions.

The handle H, by which the ring R is reciprocated in the annular slideway A, is at its lower end journaled between ears $h^5$ $h^5$, upwardly projected from the ring R. This handle at its lower end where pivoted has an offset $h^4$ and upon the under side of the latter a downwardly-projected locking-pin $h^6$. The letter $h^7$ designates a hole or sink made in the bed into which this pin enters to register and lock the ring R in a proper position for its initial movement. This handle is shown as locked at Figs. 1, 5, and 7, and as unlocked at Fig. 2. At Fig. 6 the handle-offset $h^4$ is shown as extended inwardly instead of outwardly from the handle, as in the other figures, with the sink placed inside of the ring, and as thus constructed is shown with the ring locked and the pin and sink indicated by a dotted line. As thus arranged to connect, as shown at Fig. 6, and also in the other figures, when the ring R is locked the slide-pins of the segments which operate the infolders will be positioned at a point between the eccentric and concentric parts of the segment-slots, so that when the ring is operated by the handle a part of the segment slide-pins will move in the concentric parts of the segment-slots with the infolders which they actuate remaining at rest, while other of the segment-pins will be operated to move in the eccentric parts of the slots to move inwardly the infolders which they actuate, and when the handle is operated to reverse the ring movement by its return in reciprocation the infolders at first actuated will have their slide-pins moved in the concentric parts of the segment-slots to be at rest while the others will in sequence be operated to move inwardly by the engagement of their segment-pins with the eccentric parts of the slots with the infolds last produced overlapping at their corners those first made. When the segments are thus provided with slots having eccentric and concentric parts, by turning over such of the segments as have been arranged to have concentric parts of the slots first engage with the segment-pins, the latter will engage with the eccentric parts of all of the segment-slots, and this will cause all the infolders to move inwardly simultaneously, and thus infold all the edges of the blank at the same time—a desirable condition for the infolding of some kinds of blanks—and thus one machine may be adapted to both kinds of infolding.

The operation of the combined parts is as follows: A blank B⁴ having been placed upon the bed, the templet is operated to descend onto the blank with the templet-plates preferably expanded. This being done, the ring is moved to actuate such of the sliding pins as will enter the eccentric parts of the segment-slots and the infolders which they actuate to move inwardly and carry the subtending edges of that part of the blank which they infold over the corresponding edges of the templet. The previously-expanded edges of the templet are then drawn inwardly from out the infolds, and the pressers are operated to descend onto and to press in such of the infolds as have been thus formed in the blank. The templet-plates are now again expanded, and the ring R is moved to bring the slide-pins of the remaining infolders into the eccentric parts of the other segment-slots to actuate the infolders they operate to move inwardly, and thus carry the remaining unfolded edges of the blank over the expanded edges of the templet when the plates of the latter are again drawn inwardly, and the pressers are operated to descend onto the blank as before to press in the infolds last made. After the foregoing steps have been proceeded with the templet is raised from off the bed, the infolded blank is removed, and another placed upon the bed. To have the overlaps of the infolds at the corners produced first upon one infold and then upon the other, so that each pair of blanks will interlock when sewed, the initiatory movement of each reciprocation of the ring R may be reversed as to direction and so that the infold first produced by one reciprocation of the ring R will be that last produced when the initial movement of the ring as to direction is reversed in a succeeding reciprocation or oscillation. If desired, however, a series of blanks may be infolded, using the same initiatory movement of the ring, and then a corresponding number infolded by reversing the initiatory direction of the ring's movements. By the "initiatory movement" I refer to the first movement made by the ring from where it is locked to the bed, and this may be in either direction. The purpose of the locking device is to facilitate the adjusting of the ring to its central position and to retain it there.

I do not wish to limit myself to a machine in which the actuating ring or slide has but two ranges of movement to permit the operating of infolders successively in sets or series, as it may be desirable to produce the infolds in more than one or two sets in some forms of blanks.

The several cam-segments or cams form a series of infolders operating instrumentalities, and the ring to which they are connected is, broadly speaking, a means or device constructed and fitted to permit their combined arrangement in a substantially circular or ring-like form or surrounding the central portion of the machine.

What I claim as my invention is—

1. In an infolding-machine for cuff-blanks or analogous articles, the combination of a support for the blanks to be infolded, a templet adapted to be positioned upon and removed from the blanks upon said support, the said templet provided with expanding and contracting plates having edge portions adapted to bear directly upon the blanks upon said support, and within edge portions of the blanks, means for infolding edge portions of the blanks over edge portions of the templet, whereby of two adjacent blank edge portions which meet at a corner of said templet one may be turned in before the other so that the latter may overlap the former, and means for pressing the infolded blank edges upon the said support.

2. In an infolding-machine for cuff-blanks or analogous articles, the combination of a support for the blanks to be infolded, an expanding and contracting templet having edge portions adapted to bear directly upon the blanks upon said support and within edge portions of the blanks, means for infolding edge portions of the blanks over edge portions of the said templet in successive operations, so that infolds last formed may overlap other infolds, and means for pressing the infolds of the blanks after each successive infolding operation.

3. In an infolding-machine for cuff-blanks or analogous articles the combination of a support for the blanks to be infolded, infolders constructed and fitted to move inwardly and outwardly to infold edge portions of the blanks, a part for operating infolders, mechanism actuated by said part for effecting the inward and outward movements of infolders successively in sets so that lock-corners may be formed on said blanks, said part being reversible in movement to reverse the order in which the infolds are formed so that the two parts of a locked-corner cuff may be produced with a single machine.

4. In a machine for infolding cuff-blanks or analogous articles the combination of a support for the blanks, an expanding and contracting templet having edge portions adapted to bear directly upon the blanks upon said support, infolders constructed and fitted to move inwardly and outwardly to infold edge portions of the blanks over edge portions of said templet, means for operating the infolders whereby less than the whole number thereof may be caused to infold edge portions of the blanks, while the remaining infolders do not so act, and means for pressing the infolds of the blanks between said support and infolders.

5. In a machine for infolding cuff-blanks or analogous articles, the combination of a support for the blanks to be infolded, infolders constructed to move inwardly and outwardly to infold the blanks upon said support, means for effecting the inward and outward movements of said infolders so that one or more infolders may be caused to form infolds while other infolders do not so act, and means for pressing the infolds of the blanks between said support and infolders.

6. In a machine for infolding cuff-blanks or analogous articles, the combination of a support for the blanks to be infolded, a templet having edge portions adapted to bear upon the blanks upon said support, and within edge portions of the blanks, infolders constructed to move inwardly and outwardly to fold edge portions of the blanks over edge portions of said templet, means for effecting the inward and outward movements of said infolders whereby less than whole number of said infolders may be caused to form infolds while the remaining infolders are not forming infolds, and subsequently other infolders caused to act similarly, and means whereby the infolds so formed may be pressed between the support and infolders before the latter are moved outwardly.

7. In a machine for infolding cuff-blanks or analogous articles, the combination of a support for the blanks, means for infolding less than the whole number of edge portions of the blanks upon said support, means for subsequently infolding other edge portions, whereby the infolds last formed may overlap other infolds, and means for pressing the infolds of the blanks, the blanks being held stationary upon said support throughout the said infolding operations and the said pressing operation.

8. In a machine for infolding cuff-blanks or analogous articles, the combination of a support for the blanks to be infolded, infolders constructed to move inwardly and outwardly, a part fitted to receive a to-and-fro movement, and means intermediate of said part and of infolders whereby the said part may effect the inward and outward movements of one or more infolders to infold edge portions of the blanks, while the remaining infolders do not so act.

9. In a machine for infolding cuff-blanks or analogous articles, the combination of a support for the blanks to be infolded, infolders constructed to move inwardly and outwardly, a part fitted to receive a to-and-fro movement, said part having two ranges of movement, and means intermediate of said part and of infolders, whereby the said part in one range of its movement may effect the inward and outward movements of one set of infolders, and in the other range the inward and outward movements of another set of infolders, to infold by successive operations the blanks upon said support.

10. In a machine for infolding cuff-blanks or analogous articles, the combination of a support for the blanks to be infolded, infolders constructed to move inwardly and outwardly, a part fitted to receive a to-and-fro movement, said part having two ranges of movement, and a cam intermediate of said part and of infolders, said cam having a portion adapted to effect the inward and outward movements of one or more infolders as the said part is moved in one of said ranges, to infold edge portions of the blanks, the same infolders remaining inoperative as the said part is moved in the other of said ranges.

11. In a machine for infolding cuff-blanks or analogous articles, the combination of a support for the blanks to be infolded, infolders constructed to move inwardly and outwardly to infold edge portions of the blanks, members fitted to move to and fro in unison, and a cam intermediate of each of said members and of an infolder, said cam having an operative and an inoperative portion, and so arranged that the to-and-fro movement of said members may effect the inward and outward movements of said infolders in sets to infold the edge portions of the blanks by successive operations.

12. In a machine for infolding cuff-blanks or analogous articles, the combination of a support for the blanks to be infolded, infolders constructed to move inwardly and outwardly, members fitted to oscillate about a common center, and a cam intermediate of each member and of an infolder, said cams having an eccentric portion for effecting the inward and outward movements of infolders to infold edge portions of the blanks, and a concentric portion.

13. In a machine for infolding cuff-blanks or analogous articles, the combination of a support for the blanks to be infolded, infolders constructed to move inwardly and outwardly, a ring, and means intermediate of said ring and of infolders whereby one movement of the said ring may operate less than the whole number of infolders to infold edge portions of the blanks, while the remaining infolders do not so act.

14. In a machine for infolding cuff-blanks or analogous articles, the combination of a support for the blanks to be infolded, infolders constructed to move inwardly and outwardly, a ring fitted to receive a to-and-fro movement, and means intermediate of said ring and of infolders whereby the ring may effect the inward and outward movements of infolders successively in sets, so that the infolds of the blanks may be produced by successive infolding operations, and the infolds last formed overlap other infolds.

15. In a machine for infolding cuff-blanks or analogous articles, the combination of a support for the blanks to be infolded, infolders constructed to move inwardly and outwardly, a ring fitted to receive a to-and-fro movement, said ring having two ranges of movement, and cams actuated by said ring to operate said infolders, said cams having an operative and an inoperative portion and arranged so that less than the whole number of said cams are in their operative position when the said ring moves in one of said ranges, and other cams in their operative position when the ring moves in the other range, whereby the ring may operate the said infolders successively in sets.

16. In a machine for infolding cuff-blanks or analogous articles, the combination of a support for the blanks to be infolded, infolders constructed to move inwardly and outwardly, a part fitted to receive a to-and-fro movement upon the two sides of an intermediate position, means operated by said part for effecting the inward and outward movements of said infolders, and a device for retaining the said part in said intermediate position.

17. In a machine for infolding cuff-blanks or analogous articles, the combination of a support for the blanks to be infolded, infolders constructed to move inwardly and outwardly, a part fitted to receive a to-and-fro movement, and a device operated by said part to effect the inward and outward movements of infolders, said device being reversible so that one or more infolders may be caused to move inwardly to produce infolds on the blanks, while other infolders are not moving inwardly.

18. In a machine for infolding cuff-blanks or analogous articles, the combination of a support for the blanks to be infolded, infolders constructed to move inwardly and outwardly, a ring, and cams intermediate of said ring and of infolders, one or more cams being constructed so that they may be reversed in position, whereby the cams which are not reversed in position will be adapted to operate infolders at a different time from the infolders which are operated by such reversed cams.

19. In a templet for machines for infolding cuff-blanks or analogous articles, the combination of a stock, templet-plates constructed to move inwardly and outwardly, and means for effecting the inward and outward movements of said plates whereby one or more of said plates may be moved outward before other plates, the first-mentioned plates having a cut-away area into which other plates may pass when drawn inwardly.

20. In a templet for machines for infolding cuff-blanks or analogous articles, the combination of a stock, templet-plates fitted to said stock to move inwardly and outwardly, said plates having edge portions for defining the blanks, cut-away areas within said defining edge portions of one or more of said plates, and means for effecting the inward and outward movements of first one and then others of said plates whereby plates which meet to form a continuous edge when moved outwardly, may when moved inwardly pass one within the cut-away area of another.

21. In a templet for machines for infolding cuff-blanks or analogous articles, the combination of a stock, templet-plates constructed and fitted to move inwardly and outwardly, a part fitted to said stock to move to and fro, and means intermediate of said part and of templet-plates whereby the said part may first operate less than the whole number of said plates to move in one direction and subsequently operate the remaining plates to move in the same direction, whereby plates which form a continuous edge when moved outwardly, may be moved inwardly without overlapping.

22. In a machine for infolding cuff-blanks or analogous articles, a mechanism for infolding certain forms of blanks, the same consisting of infolders constructed to move inwardly and outwardly, in combination with an infolder fitted to swing inwardly and outwardly, and means operated by the first-mentioned infolders for effecting the movements of said swinging infolder.

23. In a machine for infolding cuff-blanks or analogous articles, a mechanism for infolding projecting portions of the blanks, the same consisting of an infolder constructed to move inwardly and outwardly, in combination with an infolder for the projecting portions, fitted to the first-mentioned infolder to swing inwardly and outwardly, and means for causing the last-mentioned infolder to swing inwardly and outwardly to infold the projecting portions of the blanks.

24. In a machine for infolding cuff-blanks or analogous articles, the combination of a support for the blanks to be infolded, infolders constructed to move inwardly and outwardly, an infolder fitted to one of the first-mentioned infolders to swing to and fro to infold projecting portions of the blank edges, and means operated by another of the first-mentioned infolders for effecting the movements of said swinging infolder.

25. In a machine for infolding cuff-blanks or analogous articles the combination of a support for the blanks to be infolded, infolders for infolding edge portions of the blanks, infolder-bars connected to infolders, fitting devices separable from the support whereby the infolder-bars are fitted to the support to move inwardly and outwardly, the said fitting devices adapted to be changed in position upon said support whereby the one set of infolder-bars may be employed in the infolding of various forms of blanks; means for securing said fitting device upon said support and a part for effecting the inward and outward movements of the infolder-bars.

26. In a machine for infolding cuff-blanks or analogous articles the combination of a support for the blanks to be infolded, a templet having edge portions adapted to bear directly upon the blanks upon said support, and within edge portions of the blanks, infolders for infolding edge portions of the blanks over edge portions of the templet, infolder-bars connected to infolders, fitting devices separable from the support whereby the infolder-bars are fitted to the support to move inwardly and outwardly, the said fitting devices adapted to be changed in direction so that varying forms of blanks may be infolded through one set of infolder-bars, means for securing said fitting devices upon said support; and a part for effecting the inward and outward movements of infolder-bars.

27. In a machine for infolding cuff-blanks or analogous articles the combination of a support for the blanks to be infolded, infolders for infolding edge portions of the blanks, infolder-bars constructed to move inwardly and outwardly, and connected to infolders, guides for infolder-bars, the said guides separable from the support, adjustable means for securing infolder-bar guides upon said support, so that the said guides may be adapted to the infolding of varying forms of blanks, and a part for effecting the inward and outward movements of infolder-bars and the infolders connected thereto.

28. In a machine for infolding cuff-blanks or analogous articles the combination of a support for the blanks to be infolded, infolders for infolding edge portions of the blanks upon said support, infolder-bars constructed to move inwardly and outwardly, and connected to infolders, guides for infolder-bars, means for adjusting infolder-bar guides, so that the guides may be adapted to the infolding of varying forms of blanks, a ring fitted to move to and fro, and means operated by the said ring for effecting the inward and outward movements of infolder-bars and the infolders connected thereto.

29. In a machine for infolding cuff-blanks or analogous articles the combination of a support for the blanks to be infolded, infolders for infolding edge portions of the blanks upon said support, infolder-bars constructed to move inwardly and outwardly and connected to infolders, guides for infolder-bars, the said guides being detachably connected to the machine-bed through grooves formed on the bed, whereby the guides may be adjusted to different positions on the bed, and a part for effecting the inward and outward movements of infolder-bars.

30. In a machine for infolding cuff-blanks or analogous articles the combination of a support for the blanks to be infolded, a templet having edge portions adapted to bear directly upon the blanks upon said support, and within edge portions of the blanks, infolders for infolding edge portions of the blanks over edge portions of the templet, infolder-bars constructed to move inwardly and outwardly and connected to infolders, guides for infolder-bars, the said support constructed with annular grooves, means, as bolts, engaging said grooves, for attaching said guides to the said support, a ring fitted to the support to move to and fro, and cams adjustably connected to the said ring for effecting the inward and outward movements of infolder-bars and the infolders connected thereto.

Signed at the village of Lansingburg, New York, this 24th day of April, 1897, in the presence of the two witnesses whose names are hereto written.

GARRY J. DORMANDY.

Witnesses:
 W. E. HAGAN,
 JNO. H. KNOX.